United States Patent Office 3,259,716
Patented July 5, 1966

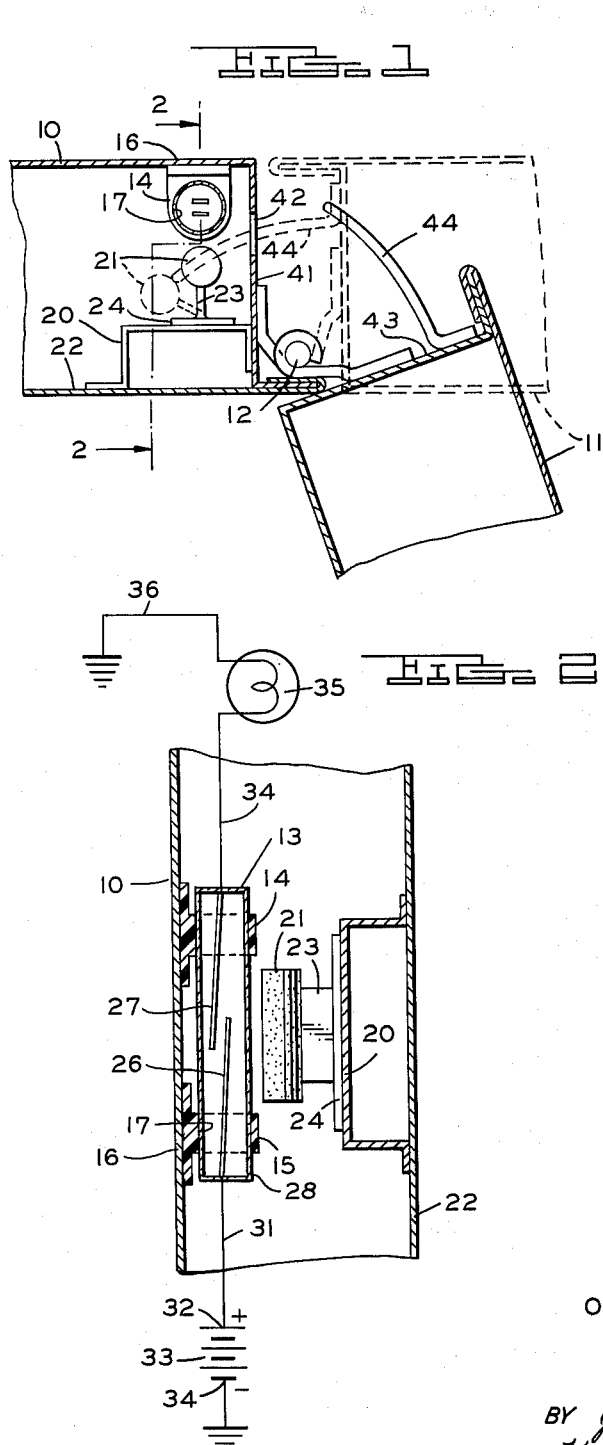

3,259,716
MAGNETICALLY OPERATED SWITCH
Ole K. Nilssen, Livonia, Mich., assignor to The Ford Motor Company, Dearborn, Mich., a corporation of Delaware
Filed Nov. 19, 1964, Ser. No. 412,350
3 Claims. (Cl. 200—87)

This invention relates to a switching mechanism and more particularly to a switching mechanism that may be used to control the courtesy light in an automotive vehicle.

In automotive vehicles, there is provided a courtesy light that is energized when a door of the vehicle is opened. This provides illumination in the interior of the vehicle for the convenience of the occupants in entering and leaving the vehicle.

In present day automotive vehicles, the courtesy light is operated by means of a push button switch that is normally biased to its closed position. A structural member of the door engages this switch when the door is in the fully closed position to open the switch and de-energize the courtesy lamp.

The present invention presents improvements over the currently used system in that it is more durable, less complicated, and more economical. The present invention includes a magnetic reed switch or relay positioned in the body structure adjacent an edge of the vehicle door. This switch mechanism is coupled to the battery of the automotive vehicle and to the courtesy lamp and will energize the lamp when the switch is closed.

A permanent magnet movable between a first position adjacent the magnetic reed switch and a second position remote therefrom is provided that has sufficient magnetomotive force to close the magnetic reed switch when it is in the first position. The magnet is normally biased into this first position when the door is in the open position thereby causing the courtesy lamp to be energized. Means are provided on the door for engaging the permanent magnet and moving it into its second position when the door is closed. In this position, the magnetomotive force of the permanent magnet is insufficient to keep the magnetic reed switch closed. As a result, the courtesy lamp is de-energized or extinguished when the door is closed.

An object of the invention is the provision of a durable, uncomplicated and economical switching mechanism.

A further object of the invention is the provision of a simple, durable and economical switching mechanism suitable for use as an automotive courtesy lamp switch.

A further object of the invention is the provision of a courtesy lamp system in an automotive vehicle that incorporates a durable, uncomplicated and economical switching mechanism operated by the opening and closing of a vehicle door.

Other objects and attendant advantages of the present invention may be more readily realized as the specification is considered in connection with the drawings in which:

FIGURE 1 is a sectional view through a vehicle body structure and door showing the magnetic reed switch and permanent magnet, and FIGURE 2 is a sectional view taken along the lines 2—2 and including an electrical schematic showing the courtesy lamp and source of electrical energy.

Referring now to the drawings in which like reference numerals designate like parts throughout the several views thereof, there is shown in FIGURE 1 an automotive body structure 10 having a door 11 movably mounted thereon by means of a hinge 12. A normally open magnetic reed switch 13 is supported within the body structure 10 by means of hangers 14 and 15 constructed of a nonmagnetic material, for example, plastic. These hangers may be bonded to a structural member 16 of the automotive body structure 10 and have depending cylindrical openings, one of which is shown at 17, for receiving the normally open magnetic reed switch 13.

A permanent magnet 21, preferably of the rubber based type, is movably mounted on a structural member 22 of the automotive body structure 10. The means for movably mounting the permanent magnet 21 may take the form of an integrally depending web 23 and flange 24 that is bonded to a bracket 20 affixed to the member 22.

The normally open magnetic switch 13 has a first reed 26 and a second reed 27 positioned within a housing 28. The reed 26 is connected through lead 31 to the positive terminal 32 of the battery or source of electrical energy 33. The other terminal 34 of the source of electrical energy or battery 33 is grounded. The reed 27 is connected through lead 34 to one terminal of courtesy lamp 35. The other terminal of the courtesy lamp is grounded through lead 36.

As shown, the permanent magnet 21 is positioned closely adjacent the magnetic reed relay or switch 13 when the door 11 is in an open position, and it is polarized in an axial direction to complete a magnetic circuit through the reeds 26 and 27. The magnetomotive force produced by the permanent magnet 21 when it is in the position shown is sufficient to close the reeds 26 and 27. This completes a circuit from the battery 33 to the courtesy lamp 35 thereby energizing this lamp and providing illumination for the interior of the automotive vehicle when the door 11 is in the open position.

The automotive body structure 10 has an end wall 41 with an opening 42 positioned therein adjacent the permanent magnet 21. The door 11 has a mating structural edge member 43 having a plunger or protrusion 44 positioned thereon that will enter the body structure 10 through the opening 42 and engage the permanent magnet. The length of the plunger or protrusion 34 is such that the permanent magnet will be moved into the dotted line position shown in FIGURE 1 so that the magnetomotive force on the reeds 26 and 27 is no longer sufficient to keep the magnetic switch 13 closed. As a result, when the door is closed and the permanent magnet 21 is moved into this position, the reeds 26 and 27 will open and the courtesy lamp 35 will be de-energized.

When the door is again opened and the plunger or protrusion 44 on the edge member 43 of the door 11 is removed from engagement with the permanent magnet 21 and passes through the opening 42, the web member 23 which is constructed of resilient rubber-like material, will move the permanent magnet back into the position shown in FIGURE 1. As a result, the reeds 26 and 27 will again close and the courtesy lamp 35 will again be energized.

It can be appreciated that there may be many variations of the movable mounting structure for the permanent magnet 21 and of the means for supporting the magnetic reed switch 13 in the body structure 10.

The present invention thus provides an uncomplicated, reliable and durable switching mechanism that may be advantageously employed as an automatic courtesy lamp switch. It also provides a courtesy lamp system for an automotive vehicle that is inexpensive and reliable.

It is to be understood that this invention is not to be limited to the exact construction shown and described, but that various changes and modifications may be made without departing from the spirit and scope of the invention as defined in the appended claims.

I claim:
1. In an automotive vehicle, a body structure, a door mounted on said body structure for movement into an open position and a fully closed position, a magnetic reed switch mounted in said body structure, a permanent magnet flexibly mounted adjacent said magnetic reed switch and providing sufficient magnetomotive force on said magnetic reed switch to cause said switch to close, and means mounted on said door and engaging said permanent magnet when said door is fully closed for moving said permanent magnet sufficiently from said magnetic reed switch to cause said switch to open.

2. In an automotive vehicle, a body structure, a door hinged to said body structure for swinging movement into an open and a closed position, a magnetic reed switch switchable between an open and a closed position mounted in said body structure adjacent an edge of said door, a permanent magnet, flexible mounting means mounting said permanent magnet in close proximity to said magnetic reed switch, said permanent magnet providing sufficient magnetomotive force on said magnetic reed switch to cause said switch to be switched to one of said positions, and means mounted on said door engaging said permanent magnet for moving said permanent magnet to a position sufficiently removed from said magnetic reed switch to cause said magnetic reed switch to be switched to the other position when the door is fully closed.

3. In an automotive vehicle, a body structure, a door hinged to said body structure for swinging movement into an open and a closed position, a normally open reed switch mounted in said body structure adjacent an edge of said door, a permanent magnet flexibly mounted in close proximity to said normally open reed for swinging movement away from said reed switch, said permanent magnet producing sufficient magnetomotive force to close said normally open reed switch when said permanent magnet is in its normal unbiased position in close proximity to said normally open reed switch, and means mounted on said door for moving said permanent magnet to a position sufficiently removed from said magnetic reed switch to cause said magnetic reed switch to open when said door is fully closed.

References Cited by the Examiner
UNITED STATES PATENTS

| | | | |
|---|---|---|---|
| 3,076,877 | 2/1963 | D'Arcy | 200—87 |
| 3,151,224 | 9/1964 | Colucci | 200—61.62 |
| 3,176,097 | 3/1965 | Wood | 200—87 |

BERNARD A. GILHEANY, *Primary Examiner.*

B. DOBECK, *Assistant Examiner.*